United States Patent [19]

Hisamoto et al.

[11] Patent Number: 5,760,392
[45] Date of Patent: Jun. 2, 1998

[54] SCALE FOR USE WITH A DISPLACEMENT SENSOR

[75] Inventors: Kenji Hisamoto; Yasushi Kaneda, both of Utsunomiya, Japan

[73] Assignee: Canon Kabushiki Kaisha, Tokyo, Japan

[21] Appl. No.: 576,697

[22] Filed: Dec. 21, 1995

[30] Foreign Application Priority Data

Dec. 27, 1994 [JP] Japan .................. 6-325133

[51] Int. Cl.⁶ ........................................ H01J 3/14
[52] U.S. Cl. .................... 250/237 G; 33/702; 33/706; 33/707
[58] Field of Search ................. 33/706, 707, 708, 33/702, 703, 704; 250/237 G, 559.29, 231.1

[56] References Cited

U.S. PATENT DOCUMENTS

| | | | |
|---|---|---|---|
| 4,530,157 | 7/1985 | Nelle | 33/125 R |
| 4,549,354 | 10/1985 | Affa et al. | 33/125 T |
| 5,104,225 | 4/1992 | Masreliez | 356/356 |
| 5,182,867 | 2/1993 | Nelle | 33/702 |
| 5,408,547 | 4/1995 | Lebby et al. | 250/216 |
| 5,500,734 | 3/1996 | Spanner | 356/356 |
| 5,534,693 | 7/1996 | Kondo et al. | 250/237 G |
| 5,537,210 | 7/1996 | Kaneda et al. | 356/356 |
| 5,574,559 | 11/1996 | Kaneda et al. | 356/356 |

*Primary Examiner*—Edward P. Westin
*Assistant Examiner*—Kevin Pyo
*Attorney, Agent, or Firm*—Fitzpatrick, Cella, Harper & Scinto

[57] ABSTRACT

A scale, which is provided for use with a displacement sensor, has a high degree of freedom and is capable of being manufactured at a low cost. The scale includes a graduation section and a base board which is formed separately from the graduation section and which is bonded to the graduation section. By bonding a graduation section to a separate base board, a single graduation section can be used for scales of varying lengths. Sufficient rigidity is provided by bonding a separate base board to the graduation section.

16 Claims, 8 Drawing Sheets

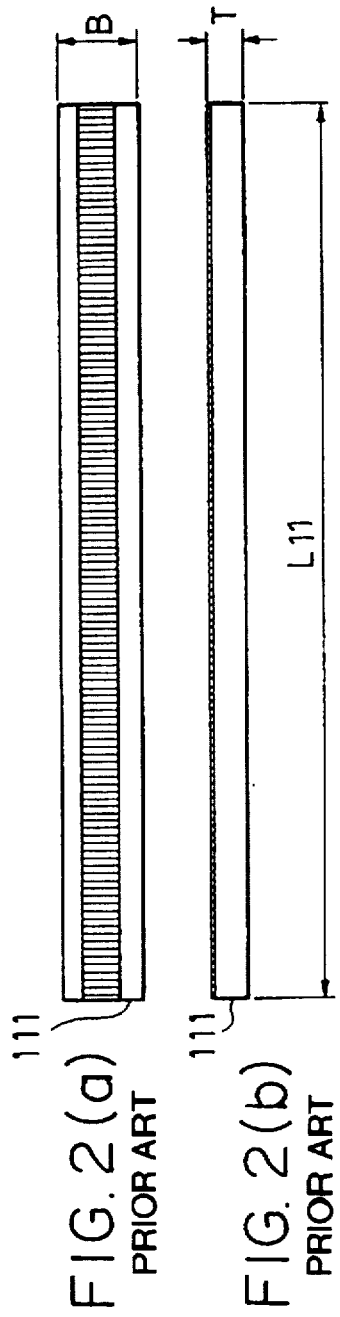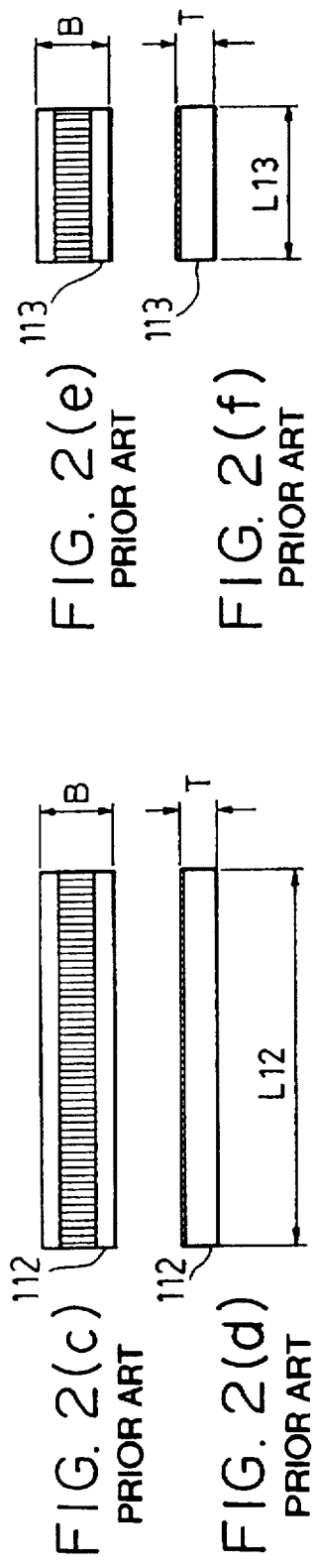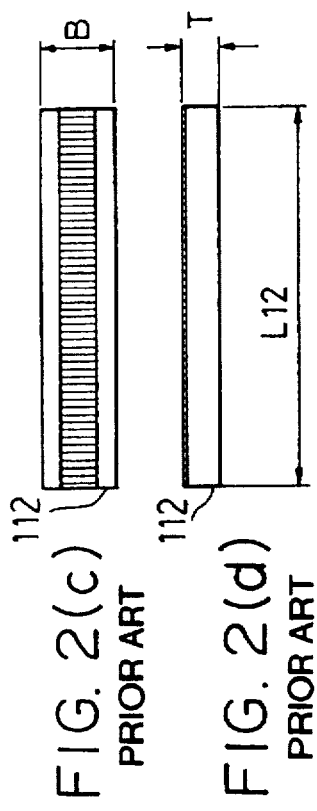
FIG. 2(a) PRIOR ART
FIG. 2(b) PRIOR ART
FIG. 2(c) PRIOR ART
FIG. 2(d) PRIOR ART
FIG. 2(e) PRIOR ART
FIG. 2(f) PRIOR ART FIG. 4(b)  FIG. 4(a)
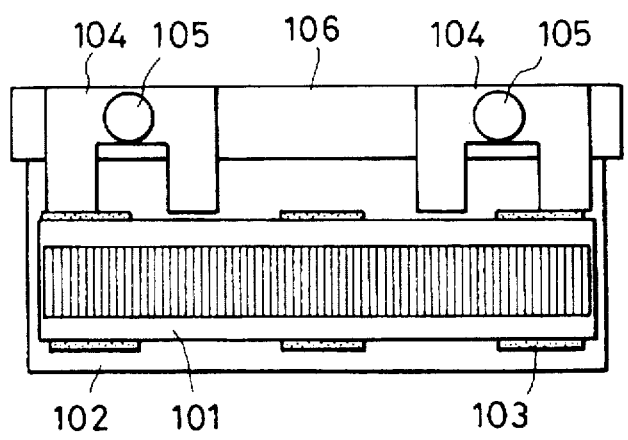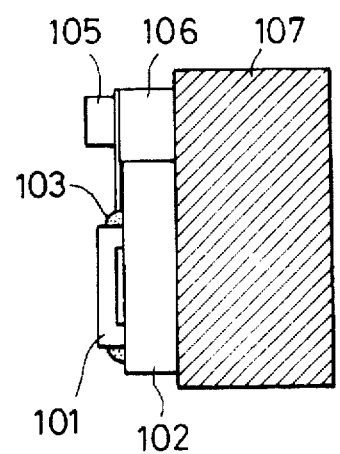
FIG. 4(c)
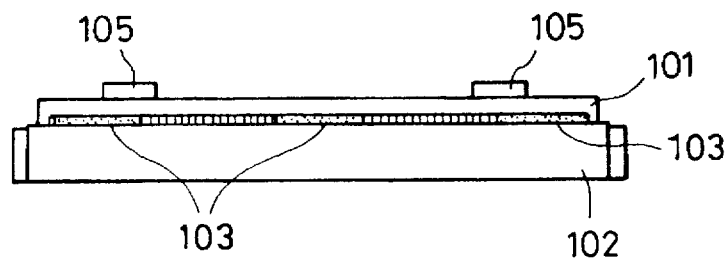

FIG. 6(b)    FIG. 6(a)
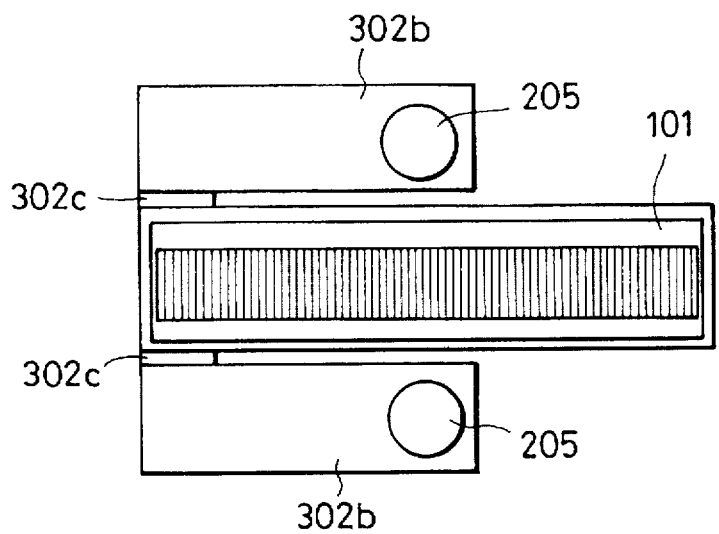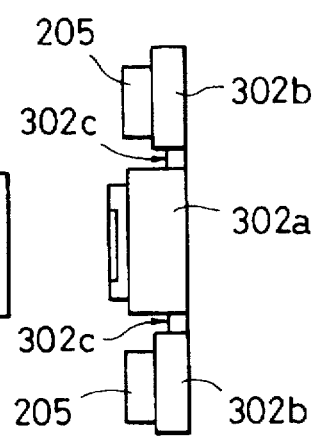
FIG. 6(c)
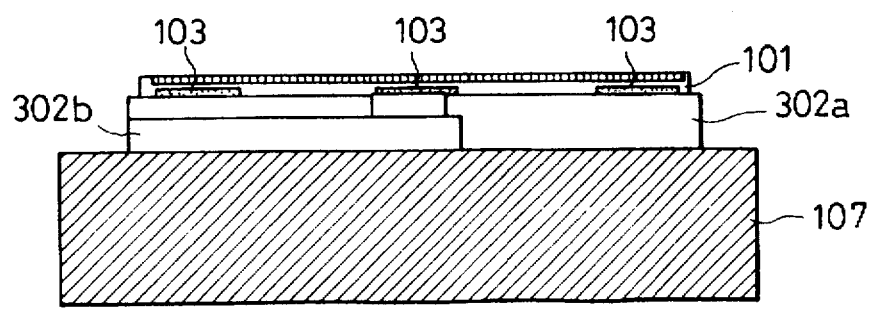

SCALE FOR USE WITH A DISPLACEMENT SENSOR

BACKGROUND OF THE INVENTION

1. Field of the Invention

The present invention relates to a scale for a displacement sensor.

2. Description of the Related Art

Optical and magnetic displacement sensors for detecting the amount of a linear displacement have hitherto been commonly used in stages of machine tools and three-dimensional measuring instruments. In such apparatuses, as shown in the top plan view of FIG. 1(a) and the front elevational view of FIG. 1(b), a main unit 1 of a detecting head is fixed to a surface plate or the like, and a scale 2 having graduations 101 provided thereon is mounted in the movement portion. The scale 2 is read by the detection section of the detecting head main unit 1, and electrical signals output from the detection section are measured to detect the amount of the displacement of the movement portion.

In order to obtain stable output signals, the scale 2 must be made of a material having sufficient toughness, having a sufficiently small linear expansion coefficient and which is minimally affected by temperature changes. In the case of a high-resolution displacement sensor, when a scale is to be disposed, the scale must be held so as not to distort the graduations. When, in particular, the resolution is of the submicron order, a slight distortion of the scale affects the output.

FIGS. 2(a)–2(f) show top plan views and front elevational views of scales 111, 112, and 113 of three different lengths for use with displacement sensors. The spacing of one graduation is equal in these three scales, and the scales are cut to a necessary length according to their purpose and use. Therefore, when the scale is used at a length of L11, the scale thickness T and the scale width B are dimensions such that bending does not occur. In this case, a thickness of greater than what is necessary is formed at a length of L12. In the case of L13, since the scale main unit is very large with respect to the effective length of the scale, it is impossible to make a small space for mounting the displacement sensor. In general, a material having a small linear expansion coefficient is expensive and difficult to process. Therefore use of more than what is necessary of such material is not suitable for a small scale with high-resolution displacement sensor in light of the cost of the material.

FIGS. 3(a) and 3(b) show an optical displacement sensor using a diffraction grating as graduations and utilizing the reflected diffraction on the reverse side of the scale 1. FIG. 3(a) shows that the scale length of the scale 1 is L21, and FIG. 3(b) shows that the scale length of the scale 1' is L22. When the scale length is L21, by making the scale have a thickness of t21, the toughness of the scale main unit can be secured, and the distance to a detecting head 2 is d21. When the scale length is L22, the scale thickness t22 at which the same toughness of the scale main unit can be secured is greater than t21. As a consequence, optical design, including the distance d22 to the detecting head 2, must be reexamined. In a case where, for example, reverse-side reflected light is used, the thickness of the scale limits the optical path length in terms of optical design, and achieving a design having a high degree of freedom is difficult.

SUMMARY OF THE INVENTION

In view of the above-described prior art, it is an object of the present invention to provide a scale for a displacement sensor which has a high degree of freedom and is capable of being produced at a low cost.

The above and further objects, aspects, and novel features of the invention will become more apparent from the following detailed description when read in connection with the accompanying drawings.

In accordance with one aspect of the invention, a scale for use with a displacement sensor includes a graduation section having an optical scale, and a base board which is formed separately from the graduation section and which is bonded to the graduation section.

In accordance with another aspect of the invention, a scale for use with a displacement sensor includes a detecting head section and a scale section such that a relative displacement between the scale section and the detecting head section can be detected. The scale section has a graduation section with an optical scale and a base board which is formed separately from the graduation section and which is bonded to graduation section.

In accordance with still another aspect of the invention, a method of producing a scale for a displacement sensor comprises the steps of producing a graduation section having an optical scale and bonding a base board which is formed separately from the graduation section to the graduation section.

In accordance with another aspect of the invention, a scale for use with a displacement sensor comprises a graduation section for detecting the relative movement of a moving member, with the graduation section having a predetermined length and a single uniform thickness, and a base board formed separately from the graduation section having a length substantially equal to the length of the graduation section. The base board has a thickness proportional to the length of the scale and is bonded to the graduation section.

In accordance with yet another aspect of the invention, a displacement sensor comprises a scale section with a graduation section having an optical scale, a base board which is formed separately from the graduation section and which is bonded to the graduation section, and a detecting head section. The detecting head section comprises a light source, a first diffraction grating for separating light from the light source, a second diffraction grating for converging light reflected from the scale section, and a photoelectric conversion element for detecting the converging light passing through the second diffraction grating.

BRIEF DESCRIPTION OF THE DRAWINGS

FIGS. 2(a), 2(b), 2(c), 2(d), 2(e) and 2(f) show scales of the conventional displacement sensor;

FIGS. 4(a), 4(b) and 4(c) show scales of a displacement sensor in accordance with a first embodiment of the present invention;

FIGS. 6(a), 6(b) and 6(c) show a scale of a displacement sensor in accordance with a third embodiment of the present invention.

DESCRIPTION OF THE PREFERRED EMBODIMENTS

Figure 1A:
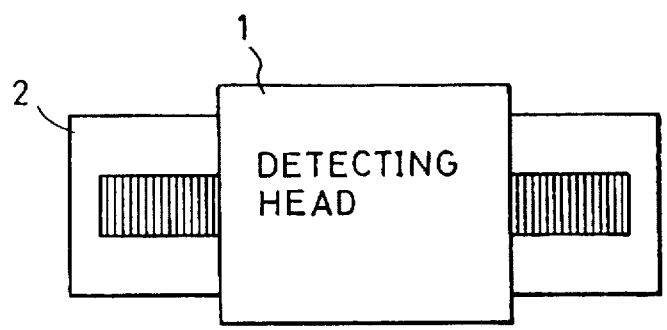
FIGS. 1(a) and 1(b) show the construction of a conventional displacement sensor.
Figure 1B:
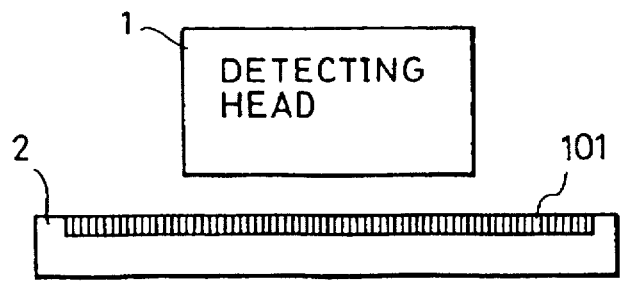
Figure 3A:
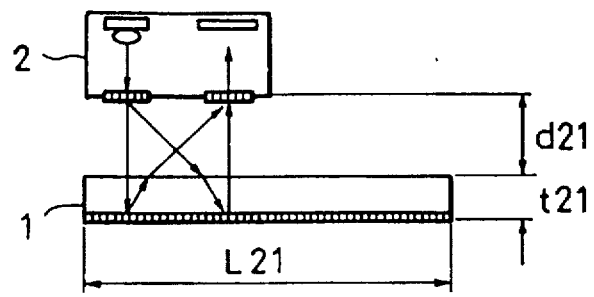
FIGS. 3(a) and 3(b) show scales utilizing reverse-side reflection in the conventional displacement sensor.
Figure 3B:
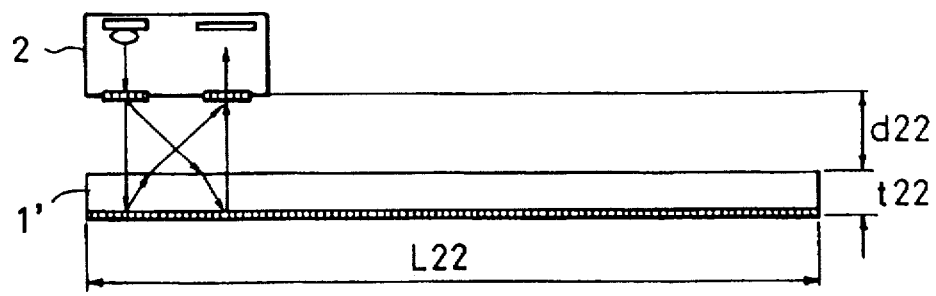

A first embodiment of a scale for a displacement sensor, to which the present invention is applied, is shown in FIGS.

4(a)–4(c). FIG. 4(a) is a side view; FIG. 4(b) is a top plan view; and FIG. 4(c) is a front view. Referring to FIGS. 4(a)–4(c), reference numeral 101 denotes a graduation section, and reference numeral 102 denotes a base board. Reference numeral 103 denotes a bonding agent. Reference numeral 104 denotes a scale press. Reference numeral 105 denotes a set screw. Reference numeral 106 denotes a scale locking member. Reference numeral 107 denotes a scale mounting surface. Both the graduation section 101 and the base board 102 are made of quartz and laminated by the bonding agent 103, such as an ultraviolet cured resin. The graduation section 101 is based on reverse-side reflection diffraction. Reverse-side reflection diffraction is a scheme in which a reflection type diffraction grating is placed on the reverse i.e. bottom, side of a transparent board, i.e., graduation section 101, as the board sits on the base board 102. With priority given to optical design, the graduation section 101 is manufactured from a thin wafer. The base board 102 is made of a quartz glass having a sufficient thickness and is laminated by the bonding agent 103. The scale formed in this way is locked by the scale press 104 on the scale locking member 106 provided on the scale mounting surface 107 and is fixed by the set screw 105.

The scale described in this embodiment employs the reverse-side reflection diffraction method. With priority given to optical design, the graduation section 101 is manufactured from a thin quartz wafer, and an ultra-high resolution graduation section can be efficiently produced by applying semiconductor exposure apparatus and etching technology. The toughness in the graduation section itself is insufficient to produce a stable output. However, since the base board 102 is made to have a sufficient toughness, no distortion or bending of the graduation section occurs, and stable output can be obtained.

The scale graduation section and the base board are made of the same material. Therefore, thermal stress of both members due to changes in the temperature does not occur. By fixing the base board section with the scale press 104 which is a support member at mounting time, deformation in the graduation section can be minimized.

Figure 5A:
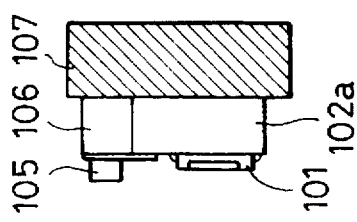
FIGS. 5(a), 5(b), 5(c), 5(d), 5(e), 5(f), 5(g), 5(h), and 5(i) show scales of a displacement sensor in accordance with a second embodiment of the present invention.
Figure 5B:
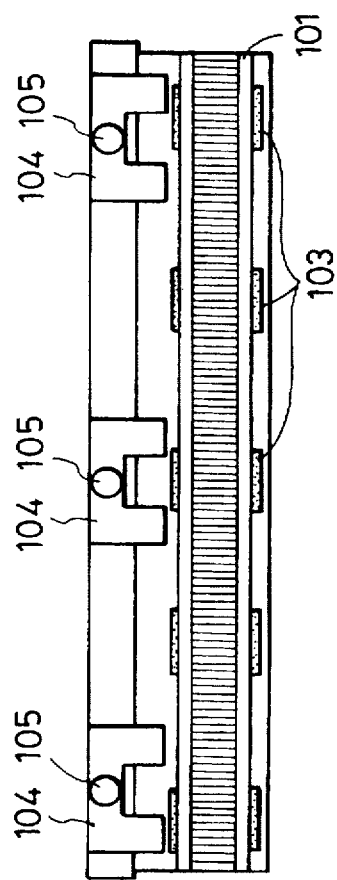
Figure 5C:
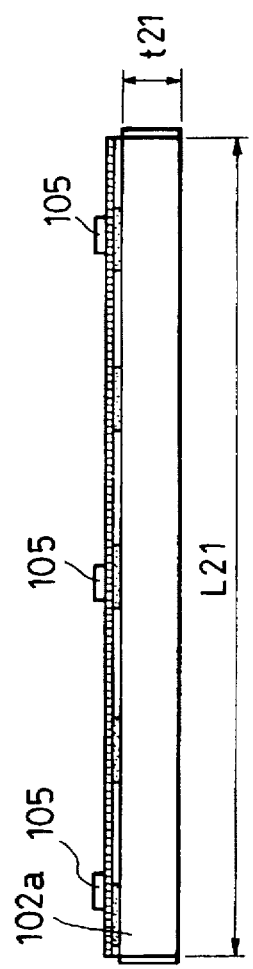
Figure 5E:
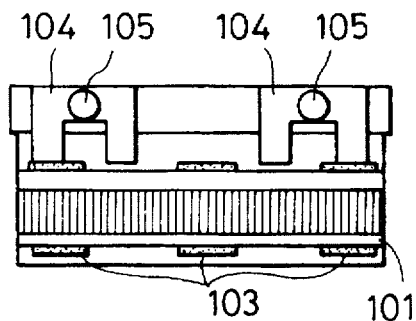
Figure 5D:
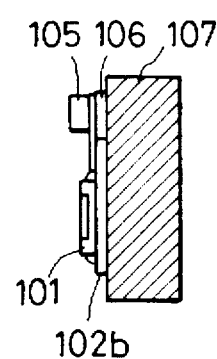
Figure 5F:
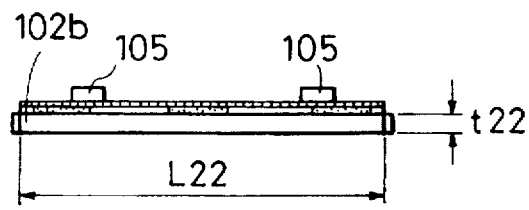
Figure 5H:
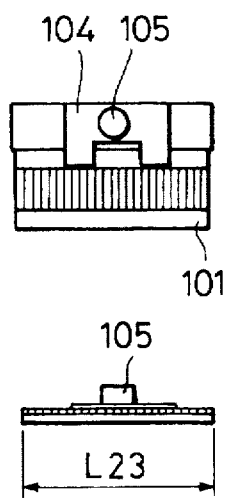
Figure 5G:
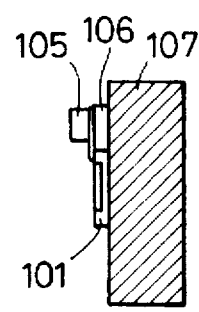
Figure 5I:
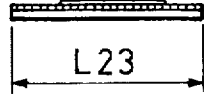

A second embodiment of a scale of the present invention is shown in FIGS. 5(a)–5(i). In this embodiment, members which are the same as those members described above are given the same reference numerals. In FIGS. 5(a)–5(c), the scale which has a long length is shown in the side view, the top plan view, and the front view. The scale which has a medium length is shown in the views of FIGS. 5(d)–5(f). The scale which has a short length is shown in the views of FIGS. 5(g)–5(i) in the same manner as in FIGS. 4(a)–4(c). The graduation section 101 is made of a quartz wafer or the like which is as thin in the first embodiment, and laminated to a base board having an appropriate thickness corresponding to the effective length of the scale. That is, in the case of a long length scale (length L21), the graduation section 101 is laminated to a thick base board 102a (thickness t21). In the case of a medium length scale (length L22), the graduation section 101 is laminated to a thin base board 102b (thickness t22). In the case of a short length scale (length L23), the graduation section 101 is used as it is.

In this embodiment, the graduation section 101 is manufactured in accordance with a fixed standard, and the thickness of the base board is set in proportion to the scale length. Thus, when the effective length is short, it is not necessary to use a scale having a thickness of more than what is necessary, and the space for mounting the entire displacement sensor can be small. In the long length type, a graduation section is laminated to a base board having a sufficient thickness and stable output can be obtained.

In a case where the reflection on the reverse side of the scale is used in the optical displacement sensor, i.e., where graduations are provided on the reverse side of the graduation section, the thickness of the graduation section becomes constant due to the above-described construction. Therefore, even an optical scale with a long length design can be used where the optical path length of the optical system is kept constant regardless of the length.

A third embodiment of an optical scale of the present invention is shown in FIGS. 6(a)–6(c). The optical scale is shown in the side view, the top plan view, and the front view in the same way as in FIGS. 4(a)–4(c) and 5(a)–5(i). Referring to FIGS. 6(a)–6(c), reference numeral 101 denotes a graduation section. Reference numeral 205 denotes a set screw. Reference numeral 302 denotes a base board. Reference numeral 103 denotes a bonding agent. Reference numeral 302b denotes a mounting section. Reference numeral 302c denotes a stress avoidance groove. The graduation section 101 has a lamination structure such that it is stacked on the base board 302a. The graduation section 101 is formed precisely from a quartz wafer or the like by a semiconductor exposure apparatus. Since quartz is a material having a small linear expansion coefficient, pitch changes due to temperature characteristics can be minimized. The base board 302a uses a super-invar having a linear expansion coefficient close to that of a quartz glass, and sufficient toughness. The top and the bottom surface thereof are polished to be flat. Use of bonding agent 103 having expansion and contraction properties, namely, having an excellent buffer function with respect to the difference in the thermal expansion of the two bonded members makes it possible for the graduation section not to be distorted.

In this embodiment, the graduation section is manufactured from a thin quartz wafer, and an ultra-high resolution graduation section can be efficiently produced by a semiconductor exposure apparatus and etching technology. Since the base board is made to have sufficient toughness, no distortion or bending of the graduation section occurs, and stable output can be obtained.

Since the base board 302a uses a super-invar, which is a metal, conventional metallic processing can be applied for grinding and drilling, and a complex shape can be produced.

The stress avoidance groove portion 302c is provided between the mounting section 302b of the base board 302a and the portion-of the base board 302a where a graduation section is laminated. When the mounting section 302b is fastened by screws, stress can be avoided, and deformation in the graduation section mounting portion 302a can be minimized.

Since severe processing accuracy is not required except for the degree of parallelism and the flatness of the top and bottom surfaces of the base board 302a, manufacturing is easy.

As described above, according to each of the above-described embodiments, a scale having a high degree of freedom and a low cost can be realized.

Figure 7:
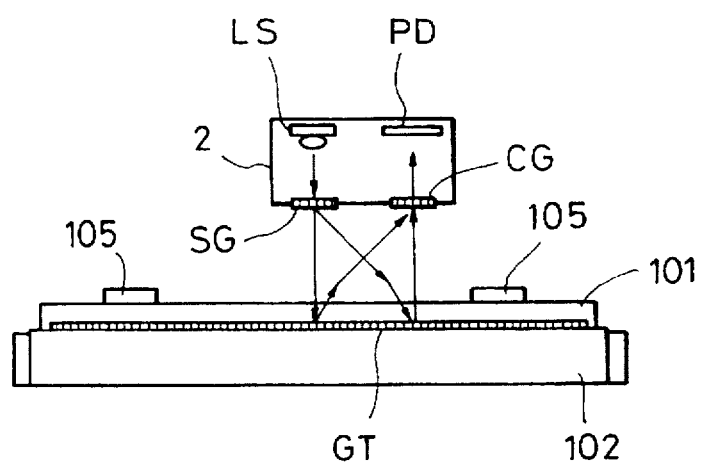
FIG. 7 shows a scale of a displacement sensor in accordance with a fourth embodiment of the present invention.

FIG. 7 is an illustration of a displacement sensor in accordance with a fourth embodiment of the present invention. This embodiment is concerned with a displacement sensor using the scale of the first embodiment. In this embodiment, members which are the same as those members described above are given the same reference numerals. Referring to FIG. 7, reference character LS denotes a light source. Reference character SG denotes a diffraction grating for separating a light beam. Reference character GT denotes a reflection type diffraction grating disposed on the reverse side of the graduation section 101. Reference character CG denotes a diffraction grating for converging a light beam. Reference character PD denotes a photoelectric conversion element. In this apparatus, a light beam from the light source LS is separated by the diffraction grating SG, and each of the separated light beams is diffracted by the diffraction grating GT serving as a graduation, after which the respective diffracted light is converged by the diffraction grating CG, and the obtained interference light beam is detected by the photoelectric conversion element PD. Frequency signals in response to the displacement of the graduation section 101 are output from the photoelectric conversion element PD, making it possible to detect the relative displacement between the graduation section 101 and the base board 102.

When such a displacement sensor is to be manufactured, the length of the scale can be designed as desired, and a low-cost scale can be used. Thus, a low-cost apparatus having a high degree of freedom as the entire displacement sensor can be realized.

The scale may be replaced with those scales of the second and third embodiments.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A scale for use with a displacement sensor, comprising:
    a graduation section having an optical scale; and
    a base board which is formed separately from said graduation section and which is bonded to said graduation section, wherein
    said optical scale is formed on a side of said graduation section which is opposed to said base board.

2. A scale for a displacement sensor according to claim 1, wherein said optical scale is a reflection type diffraction grating.

3. A scale for a displacement sensor according to claim 1, wherein said graduation section and said base board are made of the same material.

4. A scale for a displacement sensor according to claim 3, wherein said graduation section and said base board are made of a quartz material.

5. A scale for a displacement sensor according to claim 1, wherein said graduation section and said base board are laminated to each other by a bonding agent having a buffer function with respect to the difference in thermal expansions of said graduation section and said base board.

6. A scale for a displacement sensor according to claim 5, wherein said base board is manufactured from a super-invar.

7. A scale for a displacement sensor according to claim 1, wherein said base board has a groove between a mounting section of said base board and a laminated section of said base board where said graduation section is laminated.

8. A displacement sensor, comprising:
    a detecting head section; and
    a scale section such that a relative displacement between said scale section and said detecting head section can be detected, said scale section comprising:
        (i) a graduation section having an optical scale; and
        (ii) a base board which is formed separately from said graduation section and which is bonded to said graduation section, wherein
    said optical scale is formed on a side of said graduation section which is opposed to said base board.

9. A displacement sensor according to claim 8, wherein said graduation section has a diffraction grating serving as graduations, and said detecting head section detects said scale section by photoelectrically detecting the interference light of the diffracted light from said diffraction grating.

10. A method of producing a scale for a displacement sensor, said method comprising the steps of:
    producing a graduation section having an optical scale, with the optical scale being provided on a first side of the graduation section; and
    bonding a base board which is formed separately from the graduation section to the first side of the graduation section such that the optical scale on the first side opposes the base board.

11. A scale for use with a displacement sensor, comprising:
    a graduation section for detecting the relative movement of a moving member, said graduation section having a predetermined length and a single uniform thickness; and
    a base board formed separately from said graduation section having a length substantially equal to the length of said graduation section, said base board having a thickness proportional to the length of said scale and being bonded to said graduation section, wherein
    said optical scale is formed on a side of said graduation section which is opposed to said base board.

12. A scale for use with a displacement sensor according to claim 11, wherein said optical scale is a reflection type diffraction grating.

13. A scale for use with a displacement sensor according to claim 11, wherein said graduation section and said base board are made of the same material.

14. A scale for use with a displacement sensor according to claim 11, wherein said graduation section and said base board are made of quartz material.

15. A displacement sensor, comprising:
    a scale section comprising:
        a graduation section having an optical scale; and
        a base board which is formed separately from said graduation section and which is bonded to said graduation section, with said optical scale formed on a side of said graduation section which is opposed to said base board; and
    a detection head section comprising:
        a light source;
        a first diffraction grating for separating light from said light source;
        a second diffraction grating for converging light reflected from said scale section; and
        a photoelectric conversion element for detecting the converging light passing through said second diffraction grating.

16. A displacement sensor according to claim 15, wherein said graduation section has a graduation diffraction grating serving as graduations, and said detecting head section detects said scale section by photoelectrically detecting interference light diffracted from said graduation diffraction grating.

* * * * *